Sept. 5, 1967     F. FAUSTI ETAL     3,339,610
PNEUMATIC TIRES HAVING ASYMMETRICAL STRUCTURE
Filed Aug. 31, 1965     2 Sheets-Sheet 1
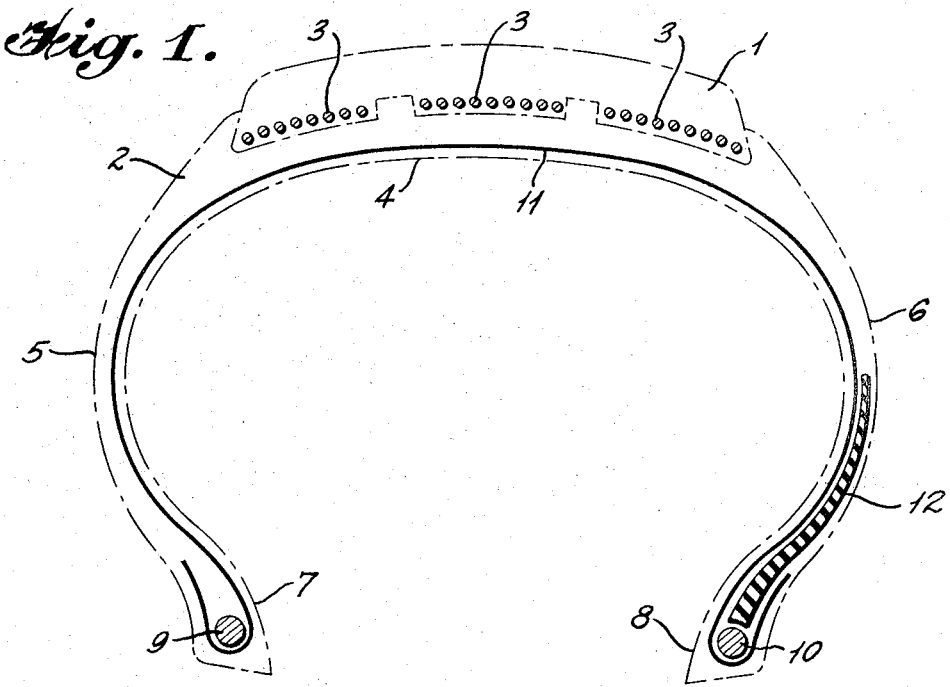
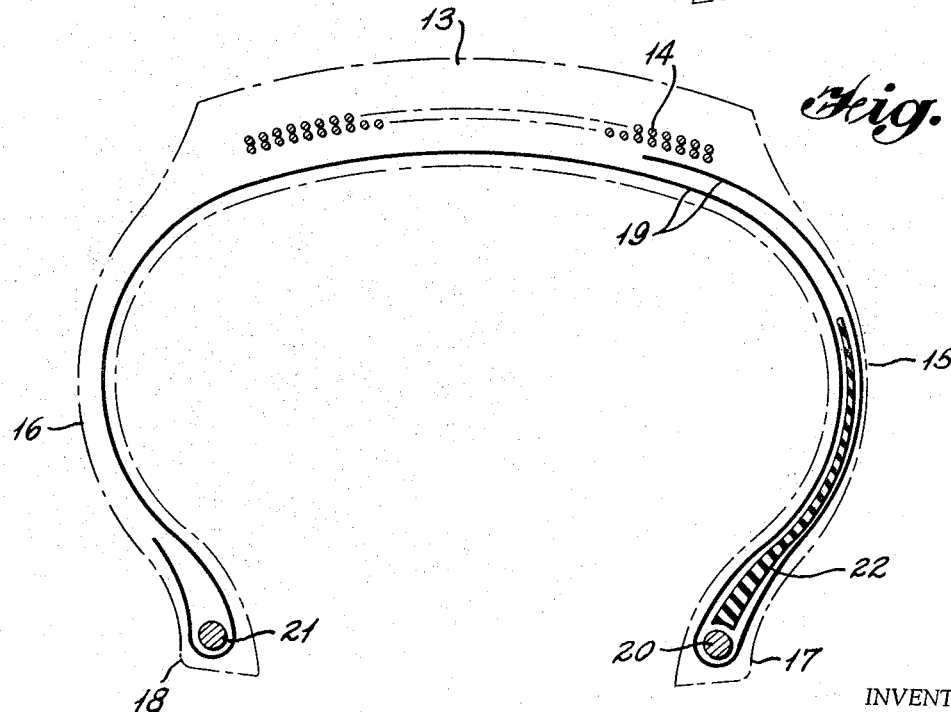
INVENTORS
Fulcieri Fausti,
Giulio Cappa
BY Stevens, Davis, Miller & Mosher
ATTORNEYS

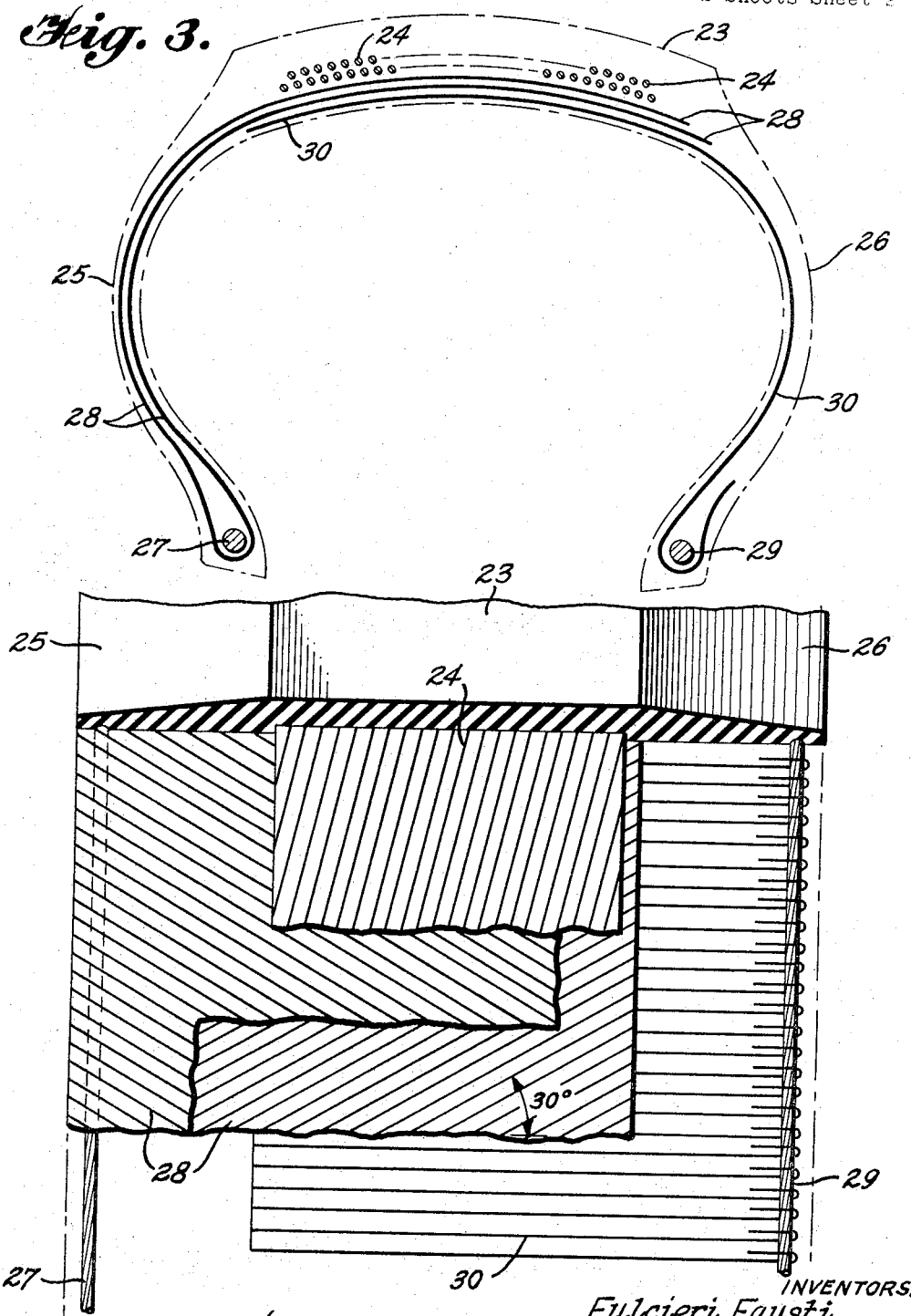

United States Patent Office 3,339,610
Patented Sept. 5, 1967

3,339,610
PNEUMATIC TIRES HAVING ASYMMETRICAL STRUCTURE
Fulcieri Fausti, Monza, and Giulio Cappa, Milan, Italy, assignors to Pirelli S.p.A., Milan, Italy
Filed Aug. 31, 1965, Ser. No. 483,959
Claims priority, application Italy, Apr. 14, 1965, 3,509/65
7 Claims. (Cl. 152—354)

ABSTRACT OF THE DISCLOSURE

A vehicle tire having a tread provided with a resisting stiffening structure, and a pair of sidewalls, one of which is more rigid than the other. The difference in the rigidity of the sidewalls can be obtained in several ways, such as by disposing a strip of hard rigid rubber in one sidewall; or by varying the number, material or arrangement of the carcass plies disposed in the sidewalls.

---

The present invention relates to pneumatic tires for vehicle wheels, and in particular to pneumatic tires in which the tread is stiffened by means of a suitable resisting structure.

In known pneumatic tires of this type the tread may be integral with the carcass, in which case the resisting structure is inserted between the tread and the carcass. If these type tires have a separate tread, the resisting structure is inserted in the tread ring.

These tires are practically always provided with a radial carcass since the resulting structure offers considerable advantages as regards resistance at high speed, road holding and so on. However, there are also some drawbacks which become especially evident on the curves. These drawbacks are substantially a low transversal rigidity and a non-linear variation of the drift force (torsional rigidity) on variation of the drift angle.

Tires provided with a radial carcass show, moreover, a small variation of the cornering force on variation of the "camber" angle, that is, the angle formed by the longitudinal plane of the wheel with a vertical line. In modern cars provided with independent suspensions, the variation of the "camber" angle is often remarkable on account of the different load and trim conditions of the car. In these cars it is desirable that a variation of the "camber" angle may result in a noticeable and progressive variation of the cornering force.

The applicant has unexpectedly found that the above indicated problem may be solved with tires having asymmetrical structure, and, more precisely, with tires in which the sidewalls have a different rigidity. This is probably due to the fact that tires of most vehicles, and particularly of vericles traveling over curves and/or having independent suspensions, work asymmetrically, in that the two sidewalls of each tire are not stressed in the same way. Therefore, a tire having sidewalls possessing different mechanical characteristics is able to solve the above problem, due to the fact that it may be rigid or flexible at points where rigidity or flexibility are required.

The object of the present invention, therefore, is a pneumatic tire for vehicle wheels which is provided with a stiffened tread and characterized in that the sidewalls have a different rigidity.

According to a first embodiment of the invention, the tire is provided, in one of its sidewalls, with a strip of very hard rubber, or of a material having similar characteristics, which extends from the bead towards the sidewall. For instance, it would be possible to use, for this purpose, one of the strips described in applicants' U.S. patent application No. 365,238 filed May 1, 1964, now U.S. Patent Number 3,232,331 issued Feb. 1, 1966. Of course, the strip would be placed in only one of the sidewalls of the tire according to the present invention.

According to another embodiment, the carcass plies are divided into two parts, each of which extends from a bead core at least as far as the shoulder of the tread nearest to said core, such parts consisting of different fabrics and therefore having different mechanical characteristics. The differences between the two types of fabric may be differences in the material (for instance, rayon and polyamide fibers), in the count of the cord constituting the fabric, or in any other feature provided that they impart a different rigidity to the two sidewalls.

In a third embodiment, the carcass plies consist of two parts as in the preceding embodiment, but the cord angles are different. For instance, in one sidewall the carcass is made of radial cords, and in the other sidewall the carcass is formed by at least two layers of fabric in which the cords are inclined at a certain angle with respect to the meridian planes and are crossed in the two layers. This angle is generally between 10° and 45°.

According to a further embodiment, different rigidity is obtained by using a different number of carcass plies in the two sidewalls of the tire.

According to a still further embodiment, the stiffening of a sidewall is obtained by spacing the carcass plies of that sidewall from one another, for instance with the interposition of a rubber sheet.

The present invention will now be better illustrated with reference to the attached drawings, given by way of non-limiting example, in which:

FIGURES 1, 2 and 3 represent, in cross section, three types of tires in accordance with the present invention; and FIGURE 4 represents in plane development the path of the cords of the carcass in the tire of FIGURE 3, and is not in scale.

FIGURE 1 represents a tire provided with a tread separate from the carcass and consists of a tread ring 1 and a carrying casing 2. The tread ring 1 is provided with a resisting structure 3, which stiffens the tread and renders it inextensible in the longitudinal direction. The carrying casing 2 comprises a crown portion 4 on which the tread is seated, and two sidewalls 5 and 6 terminating respectively with the beads 7 and 8.

The beads are provided with bead cores 9 and 10 about which are turned up the ends of the carcass ply 11, the latter consisting of a plurality of radial cords. The two sidewalls 5 and 6 are different from each other. While the sidewall 5 is constituted by a normal compound which is not very stiff, but the type generally used for this part of the tire, the sidewall 6 comprises a strip 12 of very hard and rigid rubber, having a progressively decreasing transversal section and extending from the bead 8 towards the crown portion 4. Such strip of hard rubber may be constructed and disposed in the tire as described in the above cited U.S. Patent Number 3,232,331. Since the above described pneumatic tire has one sidewall 6 which is remarkably more rigid than its other sidewall 5, the behavior of the tire is therefore asymmetrical.

According to the alternative embodiment illustrated in FIGURE 2, the tire comprises a central portion consisting of a tread 13 provided with a resisting stiffening structure 14, and two sidewalls 15 and 16 respectively terminating with the beads 17 and 18. The tire is also provided with a radial carcass ply indicated at 19, which turns up about the bead cores 20 and 21. The turn-ups of the carcass ply 19 have a different height—the turn-up of sidewall 15 extending as far as the tread shoulder, and the turn-up of sidewall 16 having a normal height and therefore terminating in the lower portion of the sidewall. This tire would already have an asymmetrical behavior on account of the different number of plies used in the two sidewalls but, in order to increase such asymmetry, a strip 22 of rigid and hard rubber of the type indicated in the description of FIGURE 1 may be inserted in the sidewall 15 between the ply and the turn-up.

In the alternative embodiment illustrated in FIGURES 3 and 4, the tire consists of a tread 23, a stiffening structure 24, and by two sidewalls 25 and 26. The sidewall 25 comprises a structure formed by a bead core 27 and by a strip 28 folded about the bead core, the two ends of which terminate in the tread portion. The cords of the strip 28 form an angle of 30° with the meridian plane of the tire. The sidewall 26 comprises a structure formed by a bead core 29 and by a strip 30 of cords lying in the meridian planes. The strip 30 departs from the tread portion, extends in the sidewall 26, turns up about the bead core 29, and terminates at the height of the usual turn-ups of the carcass plies. A pneumatic tire of this described type has an asymmetrical behavior due to the greater rigidity of the sidewall 25 in respect to the sidewall 26. In order to increase this difference in rigidity, it is possible to use materials having different mechanical characteristics. For instance, the strip 28 may consist of rayon cords, while the strip 30 may consist of cords of polyamide fibers.

The various arrangements illustrated in the example may be adopted as alone or in combination with one another, according to the desired degree of asymmetry.

It is understood that the above reported examples have not a limiting character and that the present invention includes any alternative embodiment in accordance with the above-indicated inventive principle. For instance, the turn-ups which extend as far as the tread portion (FIGURE 2) or the folded strips (FIGURES 3 and 4) may be replaced by simple strips fastened to the bead cores in an already known way.

What is claimed is:
1. A pneumatic tire for vehicle wheels comprising a tread provided with a resisting stiffening structure, a first sidewalls and a second sidewall, said first sidewall having a strip of hard, rigid rubber extending from the bead thereof towards said tread so that said first sidewall is more rigid than said second sidewall.

2. A pneumatic tire as in claim 1, wherein said strip has a progressively decreasing transversal section.

3. A pneumatic tire for vehicle wheels comprising a tread provided with a resisting stiffening structure, a first sidewall and a second sidewall, and a plurality of carcass plies disposed in said sidewalls, said first sidewall containing a greater number of plies than said second sidewall, so that said first sidewall is more rigid than said second sidewall.

4. A pneumatic tire for vehicle wheels comprising a tread provided with a resisting stiffening structure, a first sidewall, a second sidewall, and a carcass ply extending around the bead cores of said sidewalls, one end of said ply terminating at the tread shoulder of said first sidewall, and the other end of said ply terminating at the lower portion of said second sidewall, so that first sidewall is more rigid than said second sidewall.

5. A pneumatic tire for vehicle wheels comprising a tread provided with a resisting stiffening structure, a first sidewall, a second sidewall, and at least one carcass ply disposed in each of said sidewalls, each ply of said first sidewall extending from said tread, around the bead core and terminating in said tread, each ply of said second sidewall extending from said tread, around the bead core, and terminating in the lower portion of said second sidewall, so that said first sidewall is more rigid than said second sidewall.

6. A pneumatic tire for vehicle wheels comprising a tread provided with a resisting stiffening structure, a first sidewall, a second sidewall, and at least one carcass ply disposed in each of said sidewalls, each of said plies comprising a plurality of cords, the cords of the ply of said first sidewall forming an angle between 10° and 45° with the meridan plane of the tire, and the cords of the ply of the second sidewall being radial, so that said first sidewall is more rigid than said second sidewall.

7. A pneumatic tire for vehicle wheels comprising a tread provided with a resisting stiffening structure, a first sidewall, a second sidewall, at least one carcass ply disposed in each of said sidewalls, the carcass ply in said first sidewall being formed by a material less extensible than the material forming the ply of said second sidewall, so that said first sidewall is more rigid than said second sidewall.

References Cited

UNITED STATES PATENTS 2,869,610  1/1959  Lippmann et al. __ 152—352 X
2,996,096  8/1961  Powers _____ 152—352

ARTHUR L. LA POINT, *Primary Examiner.*

C. W. HAEFELE, *Assistant Examiner.*